Jan. 16, 1951 G. M. JONES 2,538,566
COOKING VESSEL
Filed July 23, 1946

*George M. Jones*, INVENTOR.
BY Homer L. Montague
ATTY.

UNITED STATES PATENT OFFICE 2,538,566

COOKING VESSEL

George M. Jones, Salt Lake City, Utah

Application July 23, 1946, Serial No. 685,732

4 Claims. (Cl. 219—44)

This invention relates to cooking devices, particularly of a kind adapted for the cooking of meat and other foods by a combination of radiant heat and pressure.

It is an object of my invention to provide a device of the above kind which will enable food to be subjected simultaneously to the action of direct radiant heat and pressure, whereby the food is cooked without loss of flavor. A further object is to provide such a device in which the source of radiant energy is within the device, yielding a greater efficiency than is obtained when the heat is conducted to the food through the walls of the device.

Another object is to provide such a device of very simple and compact construction, which may be produced at a low cost considering the results produced, and which is easy to operate.

The above and other objects and advantages of my invention will best be understood by reference to the following detailed description of a preferred form of the device, taken in connection with the appended sheet of drawings, in which Fig. 1 is a plan view of one of the cooperating sections of the pressure vessel, Fig. 2 is a similar view of the other section, Fig. 3 and Fig. 4 are respectively views in elevation of the parts shown in Figs. 1 and 2.

Figure 1:
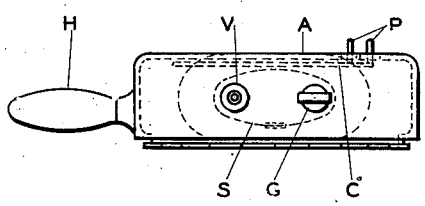
Figure 2:
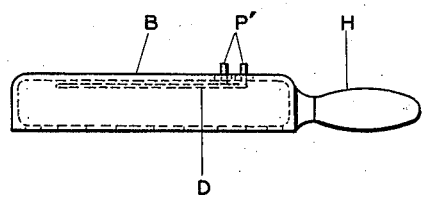

Referring now to Figs. 1 to 4 of the drawing, there are illustrated a pair of interlocking sections A and B, each providing a cavity or recess which together form the pressure chamber of the device. Section A is provided with a series of radially extending locking lugs L which may be engaged with similar lugs L' of section B to provide a pressure-tight connection upon rotation of the two sections relative to one another, in a manner well known in the art of pressure vessels. Section A contains a spirally wound electrical heating coil C, whose terminals P pass through the back wall of the section via pressure-tight insulators of any desired kind. A similar heating coil D is provided for section B and has terminals P' of a similar kind. It is obvious that a single set of electrical terminals may be employed if suitable internal connections are made between the sections.

Figure 3:
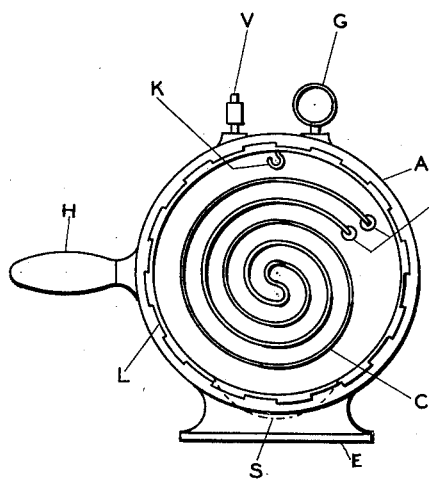
Figure 4:
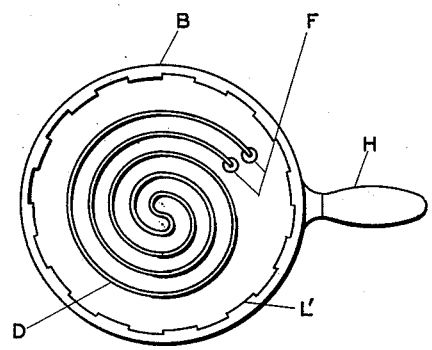

Section A may be provided with a base or stand E integral therewith, as shown in Fig. 3, so that the assembled device will be able to stand on any desired horizontal surface. Handles H are provided for each of the sections A and B, and are used in applying the necessary twist to secure the two together, and also for handling the sections when hot. These handles may be made of any desired heat insulating material, such as wood.

Section A may be provided with a pressure gauge G to indicate the pressure and temperature within the pressure compartment, and any conventional type of valve V by which the pressure may be released prior to opening the device; this valve may also function automatically to release excessive pressure if desired. A bottom recess or sump S (Fig. 3) may be provided to collect juices or the like exuded from the food during cooking.

Figure 5:
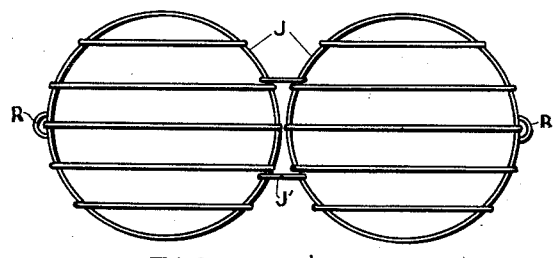
Fig. 5 is a plan view of a two-part grill adapted for use with the device.
Figure 6:
Fig. 6 is an edge view of the same grill.

Figs. 5 and 6 illustrate a type of hinged grill which is well adapted for use with the above cooker. This grill is denoted by the letter J, and comprises two sections hinged together as at J'. Each section may also carry a hanging ring or loop R, by which the closed grill may be suspended from a hook K located at the top of section A.

The operation of the device is very simple. Food to be cooked, such as a piece of meat, is placed between the sections of the grill J, which is closed and suspended from hook K. Sections A and B of the cooker are now locked together and electrical current passed through the radiant heating coils until the combination of heat from the coils and pressure built up by the heated and/or vaporized water or meat juices completes the cooking. Ordinarily, the water vaporized from meat will provide sufficient pressure, but water may be added where necessary.

I have found that the use of this device permits meat to be seared on the surface, cooked and tenderized without destroying its flavor, and that meat too tough to be fried, grilled or broiled can be rendered tender, palatable and nutritious. A considerable saving in the cooking time, as compared with prior processes, is also obtained. The gauge G, which is visible from outside the cooking container, enables the user to determine precisely, after a little practice, when the food within the container is cooked to the desired point. Thus it is unnecessary to open the vessel, with consequent loss of pressure, to determine the state of the operations.

I have described my invention herein in terms of a specific structural arrangement of parts, but I wish it to be understood that many changes and modifications can be made therein without departing from the spirit of the invention as defined in the appended claims.

I claim:

1. A cooking device comprising a pair of shallow open-faced containers, cooperating means on said containers for securing them in face to face relation in a pressure-tight manner, relatively flat radiant heating means mounted in each of said containers and disposed in spaced relation away from but parallel to the open face thereof so as to provide a clear space to accommodate a foodstuff between said radiant heating means when said containers are secured together, and means on one of said containers for supporting a foodstuff therein.

2. The invention in accordance with claim 2, in which said radiant heating means comprise electrical heating elements, and pressure-tight insulating means providing electrical connections through a wall of one of said containers.

3. The invention in accordance with claim 2, and means mounted on the outside of one of said containers for indicating the pressure developed therein.

4. A cooking utensil adapted to subject foodstuffs to simultaneous radiant heat and pressure comprising, in combination, a pair of hermetic open-faced relatively flat containers each having an end wall, cooperative sealing formations on each of said containers for sealing the same together with their open faces in communicating relationship, a radiant heating element mounted inwardly in at least one of said containers and closely adjacent its end wall, and a handle element on each of said containers extending from a lateral wall thereof in a direction parallel to the plane of its open face, said handle elements being arranged to lie adjacent one another when said containers are sealed together.

GEORGE M. JONES.

REFERENCES CITED

The following references are of record in the file of this patent:

UNITED STATES PATENTS

| Number | Name | Date |
|---|---|---|
| 1,946,220 | Lotz | Feb. 6, 1934 |
| 1,969,878 | Dumas | Aug. 14, 1934 |
| 2,148,822 | Kolouch | Feb. 28, 1939 |
| 2,308,603 | Graham | Jan. 19, 1943 |
| 2,339,974 | Austin | Jan. 25, 1944 |
| 2,378,950 | Reich | June 26, 1945 |